Nov. 1, 1949.                F. F. RIDLEY                2,486,682
                      GRAVITY LIQUID SEPARATION OF SOLIDS
Filed April 9, 1945                                 2 Sheets-Sheet 1
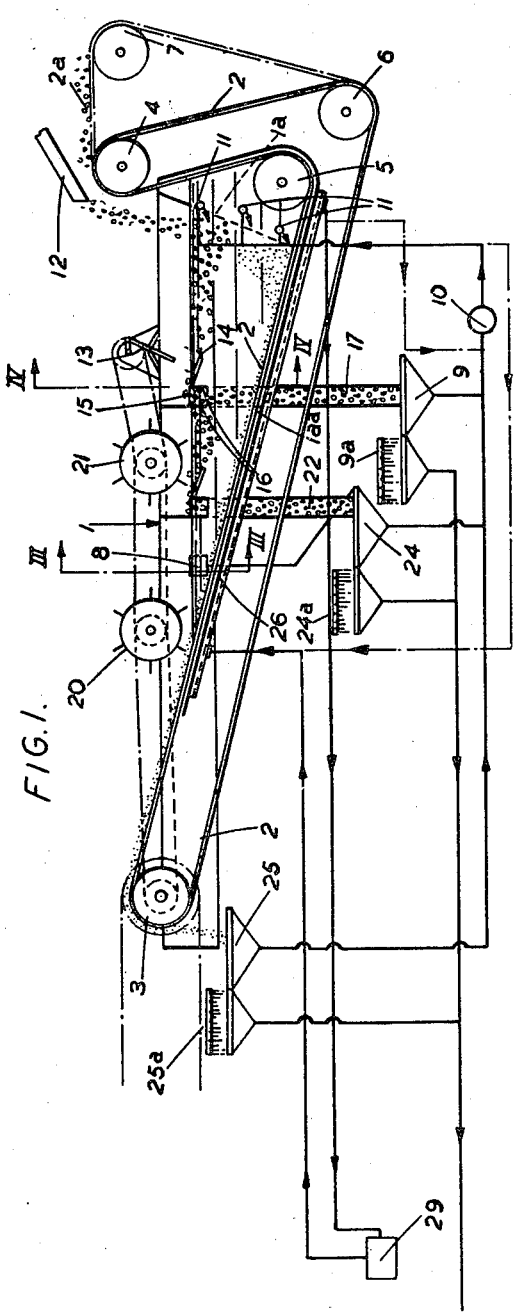
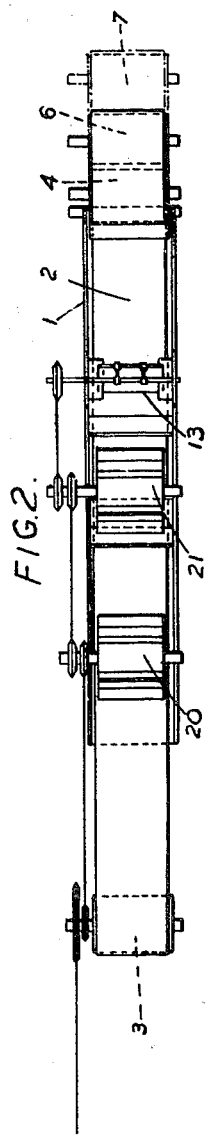
INVENTOR.
FRANK FROST RIDLEY.
BY
                    ATTORNEY.

Nov. 1, 1949.  F. F. RIDLEY  2,486,682
GRAVITY LIQUID SEPARATION OF SOLIDS
Filed April 9, 1945  2 Sheets-Sheet 2

INVENTOR.
FRANK FROST RIDLEY.
BY
ATTORNEY.

Patented Nov. 1, 1949

2,486,682

UNITED STATES PATENT OFFICE 2,486,682

GRAVITY LIQUID SEPARATION OF SOLIDS

Frank Frost Ridley, Ponteland, England

Application April 9, 1945, Serial No. 587,228
In Great Britain November 14, 1942

Section 1, Public Law 690, August 8, 1946
Patent expires November 14, 1962

9 Claims. (Cl. 209—173)

This invention is a continuation of U. S. patent application Serial No. 510,526, now abandoned, and relates to the separation of solid materials of different specific gravities by means of a stream of liquid media of such character that the less dense material is caused to float while the denser material sinks, such as in the liquid separation of shales and the like impurities from coal, and of minerals from accompanying rock or gangue in ore dressing.

Such separations are usually effected by means of a tank containing the liquid medium and provided with means for separately discharging the floating and sinking products, generally known as "floats and sinks." The liquid medium may consist of any medium of liquid properties capable of producing a suitable density, or effective density to achieve the required float and sink separation, and, for example, may consist of a suspension of finely ground solids in water, a chemical solution or an organic liquid. Suspensions may be of varying settling character according to the nature of the required separation and the physical character of the solids in suspension.

Hitherto most methods and apparatus have been adapted to the use of only certain types of liquid media, but it is of obvious practical advantage to be able to use the liquid medium most suited to the conditions of the separation having regard to relative cheapness in the particular locality.

The accuracy of separation by float and sink methods in a liquid medium of density intermediate those of the materials to be separated depends largely upon passing the materials through the liquid under quiet undisturbed conditions so that the particles being separated may move freely under the natural and sole influence of their densities to their positions in the liquid of flotation or settlement, without impedance to such movement, and upon allowing sufficient time of separation for the particles, differing little in density from the liquid to reach their proper positions as floats or sinks. Further, there is usually some material which is so close in density to that of the medium, that, in practice it never reaches the floats or the sinks and remains suspended, or "teetering," in the body of medium, and means have to be provided, usually by currents in the liquid, to move this material to a discharge, with the floats or the sinks, or separately, in order to prevent serious accumulation. The control of the movement of this material—generally referred to as middlings—without disturbing the accuracy of separation is one of the difficulties in float and sink separation.

It has been sought to achieve the desired quiet conditions by effecting the separation in large relatively quiescent volumes of medium, sometimes of considerable depth, but a disadvantage is that the continuous passage of large capacities of material through the liquid as in commercial practice, causes disturbance and displacement currents due to the resistance of the liquid to the considerable movement of the materials. Also the fall of the heavier materials through considerable depths causes eddies and rising currents which impede the settlement of particles differing little in density from the liquid. The material only slightly denser than the liquid medium sinks slowly and, in the time allowed for separation, may be unable to reach the depth necessary to join the means for discharging sinks and may then contaminate the floating product. The currents sometimes used to direct the "teetering" material to a discharge, e. g. upward, downward, or transverse in direction, frequently flow counter to the natural path of some of the materials and this also disturbs the separation. Furthermore the use of scraper or bucket type conveyors or elevators to drag the floats and the sinks through and out of the medium cause disturbances due to the projections inherent in such conveyors dragging against the resistance of the liquid particularly when moving against the induced currents or when the floats and sinks are transported in different directions. These conditions tend to prevent the settlement of some material which should sink, while some material which should float is liable to be trapped in the scrapers or buckets. Another disadvantage of earlier practice is inadaquacy of the separating period and failure to prolong the exposure of all the materials, both floats and sinks to the separating conditions until they are discharged. Usually the sinks are collected immediately on settlement by a conveyor or elevator, and transported to the rear or side of the tank away from the path of the floats and are therefore no longer subject to separation. Any lighter material, which may have been accidentally trapped in the initial sinking of the heaviest materials, has thus no opportunity of rejoining the floating product.

These difficulties and disadvantages of earlier float and sink methods adversely affect the precision of separation in varying degrees, and their elimination is concerned with the conditions under which the materials are passed through the liquid, and the stratified products withdrawn therefrom, together with control of movement of the liquid.

The object of the invention is to provide an improved method and means which will eliminate these disadvantages and allow a very delicate stratification of the materials throughout the process of separation, so that an accurate and efficient separation of sinks, floats and middlings may be effected with the employment of various liquid media to suit the circumstances. The invention particularly aims at effecting the smooth passage of the materials through the liquid with a minimum disturbance and obstruction to the free stratification of the materials by density and avoidance of entrainment so that the separation influence may be effective throughout the passage of the solids through the liquid medium.

It has been proposed in float and sink separation processes to carry out such separation in a horizontal stream, the sinks and floats being carried out of the separating zone by conveying means moving in the same direction as the stream.

The process according to the invention consists in feeding the materials into the deep end of a stream of liquid medium of uniformly diminishing cross section and depth, inducing the stream to flow convergingly towards the surface with progressively increasing mean velocity by feeding currents of liquid medium at points distributed throughout the depth and breadth of the deep end of the stream and constaining the stream to flow in the direction of diminishing cross section and depth throughout its travel and then discharging the stream at the surface in its shallower zone, mechanically conveying the sinks in the same direction as the stream in a uniformly inclined path which rises to the surface of the stream at its shallow end, transporting the floats in the same direction as the stream to discharge at a point intermediate between the feed point and the sinks discharge, entraining the middlings in the stream between the floats and the sinks and transporting said middlings to discharge at the surface of the stream beyond the floats discharge by said increasing rate of flow.

With this process, since the solid materials move with the liquid, there is substantially no fluid resistance to their progress and no relative transverse movement between solids and liquid other than the initial up and down displacement due to stratification, so that the whole process of separation takes place under the most ideal conditions of relative stillness which are possible in continuous treatments, with the avoidance of disturbance which would adversely effect the separation; while the converging flow of the stream in diminishing depth, with increasing mean rate of flow, ensures that the middlings which have neither settled nor floated at the surface are carried forward and the liquid medium thus continuously cleared of such. The converging flow of the stream and its increasing mean rate of flow is also of advantage when using a liquid medium comprising a suspension the suspension can be restrained or prevented of finely ground solids in water as settlement of by the increasing flow and convergence.

The sinks are deposited through the stream by free settlement and remain on the conveying means exposed to the separating liquid medium above it throughout the separation, so that particles may freely deposit thereon or rise therefrom according to their densities, with the result that finally only particles of greater density than the medium are discharged by the sinks conveyor. The travel of the conveyor with the stream allows the latter to be relatively shallow—since sinks can deposit onto the conveyor at any point and have not to be guided thereto—and thus sinking through great depth with corresponding current disturbance is avoided. Again, with this process the disadvantages of the scraper and bucket type conveyors are avoided because their movement with the stream does not set up local disturbances and eddies. Furthermore the rising path of the sinks and their travel with the stream enables the slowly sinking material which is only slightly denser than the liquid medium, and the smaller sinking particles, to join the rising conveying path of the sinks at an intermediate level, instead of having to sink to the greatest depth and less time is thus taken for this material to separate. The conveying means may be a moving surface as in the above mentioned specification in which I claim the float and sink process of separating solid granular materials of different densities, such as coal or mineral ores, by density displacement in a liquid medium of density intermediate those of the material being separated, in which the denser material sinks below the greatest depth of plunge of the less dense material and deposits freely in a layer which is frictionally conveyed in a plane at which the overlying liquid medium is imperviously bounded and thereby prevented from passing through such layer and raising the layer out of the liquid medium without slip or disturbance of its formation by gradual upward inclination of the path of conveying, while the floating less dense material is constrained to move above the conveyed layer of denser material in a rectilinear direction for a length of travel sufficient to ensure the sinking therefrom of all denser material and to discharge from the surface of the liquid medium independently of the conveying of denser material. With such conveying means the material settling on the said conveying means remains thereon undisturbed by mechanical influences, so that lighter particles can rise from it, throughout the separation, while its passage through the liquid is particularly smooth and free from disturbance.

The stream flow may be fed by currents distributed over its greatest depth and caused to converge to the surface in the diminishing depth to coincide with the converging travel of the floats and sinks towards their discharges at the surface. Such flow also permits the use of less stable type of suspensions as well as stable suspensions and true liquids, because the convergence towards the surface reverses the action of settlement in a stream, and thereby maintains stability and uniform density with the minimum amount of liquid motion.

The apparatus according to the invention may comprise a tank of substantially uniform width which uniformly diminishes in depth throughout its length and is adapted to contain a stream of liquid medium, inlet means distributed throughout the depth and breadth of the deep end of the said tank and outlet means at the liquid level in its shallower portion adapted to induce the stream to flow convergingly in the direction of diminishing depth of the tank, inclined mechanical conveying means traversing the said tank from its deeper end to its shallow end, said conveyor extending across the whole width of the tank and beneath the whole path of the floats and being adapted to receive the sinks settling from the floats throughout the travel of said floats and to transport the sinking materials in the direction of diminishing depth to the surface of the liquid medium, means disposed along the tank in its shallower portion at the liquid level for discharging the floating materials from the surface of the liquid medium prior to the separate discharge of the sinking material, and means disposed along the tank at the liquid level beyond the floats discharge for separately discharging the middlings.

The said conveying means may be a flexible belt of rubber, fabric or both, flexible steel, or woven wire, the return side of which may pass either over or under the tank and it may be made to traverse the whole separating zone, and be as wide as the latter. Instead of a flexible belt, the conveyor means may comprise a plate belt with articulated joints, or a conveyor of the chain scraper or chain and bucket type.

The invention will now be described by way of example with reference to the accompanying diagrammatic drawings.

In the said drawings:

Fig. 1 is an elevation of one form of apparatus.

Fig. 2 is a plan of Fig. 1.

Figure 3:
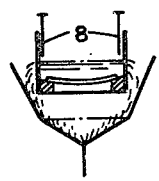
Fig. 3 is a section taken on the line III—III of Fig. 1.

Referring more particularly to the drawings, 1 is a three sided tank with its floor 1a upwardly inclined throughout its length. The tank is traversed by a flexible travelling belt 2 of approximately the width of the tank, the said belt being driven by a head pulley 3 and guided by pulleys and/or wheels 4, 5 to enter the tank from above the surface of the liquid medium at the rear end, to move forwardly along the floor of the tank and up its incline, and to emerge from the surface of the liquid medium at the extreme forward end. The surface of the belt 2 must have sufficient friction or gripping character in relation to the material treated and the inclination of the belt in a given tank to carry the material out of the liquid medium. The return run of the belt is guided by a pulley 6 below the tank to the rear end.

The belt 2 may be conveniently of canvas or canvas and rubber type or of flexible steel, and it may be flat across its width, or it may be caused to trough by means of guide wheels or rollers, or the floor of the tank may be made concave across its width. The floor of the tank and with it the belt rises at uniform inclination over the whole length of the tank. The belt 2 may when desired, be carried any suitable distance to the rear of the tank 1, as at 2a by suitable arranged pulleys such as pulley 7, to provide a simple means of collecting the materials to be separated from a remote point and feeding them to the tank without additional units. The materials may, of course, be fed to the tank independently of the belt 2, in which case no rearward extension of the latter is required. The degree of friction of the belt surface may be increased by indenting, ribbing or other minor surface formation.

Currents are caused to flow in the liquid medium longitudinally of the length of the tank, the said currents being relatively slow in the deeper part of the tank, and progressively faster as the depth diminishes towards the forward end where adjustable transverse weirs 8 (Fig. 3) are disposed in the side of the tank to carry the overflow of these currents. Also the flow converges towards the surface as it traverses the diminishing depth. The overflow together with that discharged with the floating material passes through sieves 9 and from these is pumped to the rear end of the tank by a pump 10 and refed to it by way of inlets 11 disposed at different levels to allow suitable distribution of the currents. In addition a vertical or inclined perforated plate 1aa may be provided to prevent falling back of the material fed to the tank and fouling the drum 5. This also provides an additional means of controlling the distribution of the inlet flow by closing such of the holes as may be desired.

The materials to be separated are fed into the liquid medium at or near the deeper part of the tank 1 as by a chute 12 or the extension 2a of the belt 2. The sinks thereupon settle on the belt 2 which moves at a relatively slow speed to ensure gentle passage of the material through the liquid and so avoid disturbance. The sinks are raised out of the liquid and discharged by the belt 2 at the forward end of the tank 1. The inclined movement of the sinks coincides with the upward convergence of the flow of liquid medium so that both move together without disturbance. Slowly settling material is able to settle on to the sinks conveyor at an intermediate level due to the rising path of the belt 2 and easy separation of this more difficult material is effected. The belt 2 is preferably troughed as shown. This is not only to ensure the sinks remaining on the belt, but to counteract the tendency of the belt to float when the liquid medium is of the same or greater specific gravity than the material of the belt, for such troughing imparts a rigidity to the belt which maintains its straight longitudinal form. Such troughing also provides a sealing effect at the sides of the belt by reason of the tension on the upturned edges causing them to press down on the supporting floor of the tank, thus restricting or eliminating the passage of the liquid medium or of separated material to the underside of the belt.

Figure 4:
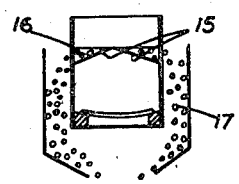
Fig. 4 is a section taken on the line IV—IV of Fig. 1.
Figure 5:
Fig. 5 is a path diagram of a scraper blade.

Part of the way along the tank and above the surface of the liquid there is disposed a scraper which may comprise a blade 13 which is operated so that it simulates the movement of paddling a canoe, as indicated in the path traced out in Fig. 5, with a view to ensuring the minimum amount of interference with the particles in their respective strata. Alternatively, a rotary scraper, for example, of the type shown at 20, may be used. The said blade 13 dips into the liquid and scrapes the floats in a direction going with the stream, over a lip 14 arranged transversely of the tank 1, and so discharges it into an inclined transverse chute 15 (Fig. 4) which has side walls 16 to isolate it from the liquid in the tank, and this is arranged to discharge the floats through the side wall of the tank. As shown, the chute 15 may be bifurcated at the centre to discharge part of the material to one side and part to the other side of the tank into a hopper 17 which leads to the sieve 9.

Alternatively, when the flow in the tank is sufficient to discharge the floats the scraper 13 may be dispensed with and the floats discharged over the lip 14—which is then slightly below the surface of the liquid—by the forward movement of the liquid.

Figure 6:
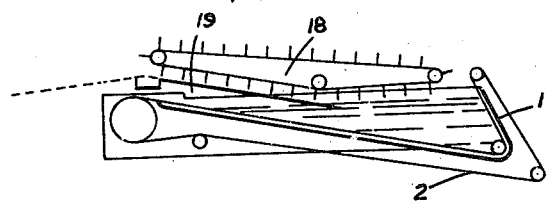
Fig. 6 is a view to a reduced scale of an alternative form of scraper.

In another alternative arrangement, a horizontal comb-type scraper may be placed over the separating length of the tank so that the blades dip into liquid and carry the floats forward to the discharge lip. In the form shown in Fig. 6 the comb-type scraper 18 is prolonged and arranged to rise out of the liquid and scrapes the floats up an incline 19 to a suitably disposed discharge point, instead of discharging through the side of the tank.

Figure 7:
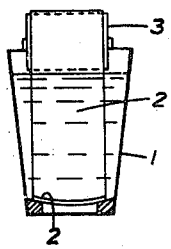
Fig. 7 is a cross section of an alternative form of tank.

The side walls of the tank 1 are normally vertical and parallel as shown, but according to one modification, as shown in Fig. 7, which is of particular utility when the floats are much greater in quantity than the sinks, the tank over the separating length may be wider at the surface than the floor, the side walls then converging downwardly to the floor width. This enables a much greater quantity of floats to be handled.

The liquid flow which is relatively slow where the separation takes place in the deeper part of the tank aids the delicacy of the separation by checking the fall of the densest material, which causes disturbing currents if allowed to fall too quickly. The average rate of flow increases as the tank gets shallower at the forward end and thereby carries forward any middlings and slower settling sinks which have neither settled nor floated at the surface and the liquid medium is thus continuously cleared of such material. This material or its heavier portions may be allowed to deposit on the belt 2 with the sinking material and may be aided to do so by a rotary scraper 20 disposed close to the belt where it leaves the liquid in the tank.

A second scraper 21 may be placed either additionally or alternatively to the scraper 20 in a slightly rearward position to discharge the bulk of the middlings separately in a similar manner to the discharge of the floats by sideway chutes 22 similar to the chutes 17. Thus the material is subject to a secondary separation after the floating material is removed. The action of the scrapers 13 and 21 is to press the material into the weir so that the overflow contains more solid material than would be carried by a free flowing weir, thereby reducing the amount of liquid overflow necessary for the discharge of solids.

Alternatively, the scraper 21 may revolve in the reverse direction to discharge the middlings into the transverse chute 15 along with the floating material, or, in such case, the chute 15 may be divided by a partition to carry floats in one side and middlings in the other. The middlings may thus be kept separate as a product of second quality or may join the floats or sinks.

In some cases the scraper 20 and/or 21 may be dispensed with, and middlings discharged with the liquid overflowing the weirs.

The belt 2 may also terminate at the liquid surface at the shallow end so that some liquid overflows with sinks and an increased flow is then maintained to the extreme forward end thus providing an additional control of the flow.

With the apparatus described the liquid medium above the moving surface is shallow in relation to its length, and its volume consequently comparatively small for the given size of separating zone, so that a relatively small volume of the flow of the liquid medium is sufficient to give rapid changing of the separating liquid to prevent cumulative contamination of the liquid from the materials being treated.

The liquid medium may be composed of a suspension of finely ground solids in water, with the flow sufficient to prevent settlement of the suspension solids in order to maintain uniform density of the suspension and the flow may be adjusted to prevent settlement according to the character of the suspension solids. The convergence towards the surface due to flowing into the diminishing cross-section provides exactly the reverse effect to the action of settling solids in a longitudinally moving suspension, the suspension solids tending to follow a downwardly inclined path. This enables the stability of the suspension and consequently its specific gravity, to be maintained in the most effective manner with the minimum amount of flow. This is a particular advantage when using an unstable or semi-stable type of suspension, for less stable suspensions, owing to their free settling properties, can be purified and recovered for using again much more easily and cheaply than suspensions of more stable character.

In order further to encourage optimum separation the rate of flow of the liquid medium may be uniform throughout the area of any given transverse cross section of the stream.

The other products of the separation are passed over the sieves 24 and 25 to drain off the liquid medium carried out of the tank with them. The drained off liquid together with that which overflows the weirs, is returned to the rear end of the tank and re-fed to it through controllable inlets 11 previously described. The medium overflowing the weirs may also be sieved if fine material from the treatment tends to accumulate in it, this depending upon the nature of the materials being treated.

The liquid medium adhering to the products after sieving is sprayed off by water as indicated at 9a, 24a and 25a and the diluted liquid resulting is purified by any suitable means according to the liquid medium used, for example by fine mesh sieving to remove coarser material, hydraulic classification to remove fine slimes and/or froth flotation. The purification is accompanied by reconcentration such as by gravitational settlement or centrifugal concentration. Any other means of purification and reconcentration may be adapted according to the character of the liquid medium used for instance a chemical solution may be subjected to heating and evaporation. The recovered liquid medium concentrated to the appropriate specific gravity, is returned to the tank circuit, while losses in the process are replaced by addition of new liquid medium.

Figure 8:
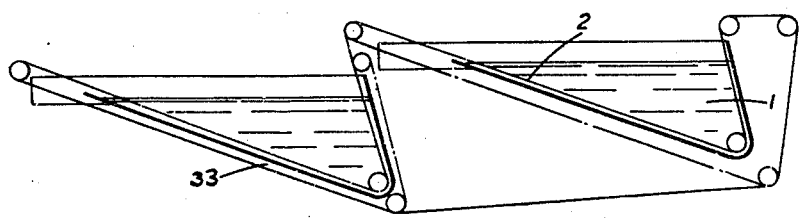
Fig. 8 is an elevation of a tandem tank arrangement.

Fig. 8 shows a modification of the invention in which the belt 2 is arranged to traverse a second tank 33 after it leaves the main tank. This second tank contains medium of higher specific gravity than that in the first tank 1, thereby enabling the sinks from the tank 1 to be separated again to give two products of different density ranges. In some cases such a secondary separation is of commercial value. The arrangement of the second tank 33 is similar to that described and will be readily understood. Alternatively instead of the one belt traversing both tanks, each tank may have its own belt as indicated in chain lines. Obviously additional tanks may be added according to the number of separations required.

The invention as described provides a simple and inexpensive method of using liquid media to carry out the most difficult type of separation in an efficient and reliable manner.

I claim:

1. Apparatus for separating solid granular materials such as coal or mineral ores in a stream of liquid medium of density intermediate those of the solids being separated, comprising a tank of substantially uniform width which uniformly diminishes in depth throughout its length and is adapted to contain a stream of liquid medium, inlet means in the deeper portion of said tank, and outlet means in the shallower portion of said tank, said inlet and outlet means being adapted to induce said stream to flow convergingly in the direction of diminishing depth of said tank, inclined mechanical conveying means traversing said tank from its deeper portion to its shallow end, said conveying means extending beneath substantially the whole path of the floats and being adapted to receive the sinks settling from the floats throughout the travel of said floats and to transport the sinks in the direction of diminishing depth to the surface of the liquid medium, means disposed along the tank in its shallower portion for discharging the floating material from the surface of the liquid medium prior to the separate discharge of the sinks, so that the materials and the stream all move in the same general direction throughout their travel, and transverse weir means disposed normal to and across the full width of the flow at the surface of the liquid medium between the separate discharges of floats and sinks for discharging the middlings.

2. The process of separating solid granular materials comprising the steps of feeding the material to be separated into the deeper zone of a body of liquid medium of density intermediate the densities of the solids being separated, said body being of diminishing depth, thereby causing the material of greater density than the liquid medium to sink through the medium and settle in a freely distributed layer which extends beneath substantially the whole separating zone, moving said layer of sinks continuously from said separating zone solely by the action of frictional contact with a moving surface along a path of conveyance rising continuously with sufficiently gradual inclination frictionally to convey the said layer of sinks to discharge at the surface of the liquid medium at its shallow end, feeding liquid medium into the deeper zone of the body of liquid medium, moving the liquid medium above said layer of sinks throughout the separating zone substantially in the same direction as the sinks layer, discharging the floats from the surface of the liquid medium independently of the conveying of the sinks at a point intermediate the ends of the body of liquid medium, and maintaining unidirectional movement of the materials being separated and the liquid medium substantially throughout their respective travels; and discharging liquid adjacent the point of discharge of the sink and removing middlings at the surface between the points of liquid discharge and the point of float discharge.

3. The process of separating solid granular materials comprising the steps of feeding the material to be separated into the deeper zone of a body of liquid medium of density intermediate the densities of the solids being separated, said body being of diminishing depth, thereby causing the material of greater density than the liquid medium to sink through the medium and settle in a freely distributed layer which extends beneath the whole separating zone, moving said layer of sinks continuously from said separating zone solely by the action of frictional contact with a moving surface along a path of conveyance rising continuously with sufficiently gradual inclination frictionally to convey the said layer of sinks to discharge at the surface of the liquid medium at its shallow end, moving the liquid medium above said layer of sinks throughout the separating zone substantially in the same direction as the sinks layer, and discharging the liquid medium adjacent the point of discharge of the layer, discharging the floats from the surface of the liquid medium independently of the conveying of the sinks at a point intermediate the ends of the body of liquid medium, and maintaining unidirectional movement of the materials being separated and the liquid medium substantially throughout their respective travels, removing middlings at the surface between the points of sinks discharge and the point of floats discharge and counteracting settlement of the suspension by discharging the current of liquid medium at different points along the shallower portion of the liquid medium to control the velocity and inclination of the flow components of the liquid medium.

4. The process according to claim 2 wherein the liquid medium is composed of a suspension of finely ground solids in water which is caused to flow longitudinally in a stream of gradually diminishing cross section and depth with increasing velocity so that the flow converges towards the surface of the stream with resulting directional components which counteract settlement of the suspension solids.

5. Apparatus for separating solid granular materials in a liquid medium of density intermediate those of the solids being separated, consisting in a tank adapted to contain a body of the liquid medium, a uniformly inclined floor in said tank, a conveyor belt adapted to traverse the floor of said tank, said conveyor belt having a substantially smooth frictional carrying surface which is sufficiently imperforate to prevent free flow of liquid medium through said belt, said belt extending beneath substantially the whole separating zone and being adapted to receive the settling sinks and rise out of the liquid medium with sufficiently gradual inclination to enable said belt to transport said sinks by frictional contact with said carrying surface out of the liquid medium, means for feeding the liquid medium into the deeper end of the tank to move rectilinearly in the same direction as the conveyor belt, means for removing the liquid medium adjacent the shallow end, said carrying surface serving to constrain the liquid medium to move over along the said surface, and means independent of the conveyor belt for removing the floats from the surface of the liquid medium intermediate the ends of the tank, and means for removing middlings at a point between the float discharge and the liquid discharge.

6. Apparatus for separating solid granular materials in a liquid medium of density intermediate those of the solids being separated, consisting in a tank adapted to contain a body of the liquid medium, a uniformly inclined floor in said tank, a conveyor belt adapted to traverse the floor of said tank, said conveyor belt having substantially smooth frictional carrying surface which is sufficiently imperforate to prevent free flow of liquid medium through said belt, longitudinal supporting means in the lower portion of said tank, said belt having its edges pressed upwards by said supporting means to impart a transverse troughing thereto and to effect a rubbing seal to prevent ingress of liquid medium and materials under said belt, said belt extending beneath substantially the whole separating zone and being adapted to receive the settling sinks and rise out of the liquid medium with sufficiently gradual inclination to enable said belt to transport said sinks by frictional contact with said carrying surface out of the liquid medium, means for feeding the liquid medium into the deeper end of the tank to move rectilinearly in the same direction as the conveyor belt, means for removing the liquid medium adjacent the shallow end, said carrying surface serving to constrain the liquid medium to move over along the said surface, and means independent of the conveyor belt for removing the floats from the surface of the liquid medium intermediate the ends of the tank, and means for removing middlings at a point between the float discharge and the liquid discharge.

7. The process of separating solid granular materials comprising the steps of feeding the material to be separated into the deeper zone of a body of liquid medium of density intermediate the densities of the solids being separated, said body being of diminishing depth, thereby causing the material of greater density than the liquid medium to sink through the medium and settle in a freely distributed layer which extends beneath the whole separating zone, moving said layer of sinks continuously from said separating zone solely by the action of frictional contact with a moving surface along a path of conveyance rising continuously with sufficiently gradual inclination frictionally to convey the said layer of sinks to discharge at the surface of the liquid medium at its shallow end, feeding liquid medium into the deeper zone of the body of liquid medium, moving the liquid medium above said layer of sinks throughout the separating zone substantially in the same direction as the sinks layer, discharging the floats from the surface of the liquid medium independently of the conveying of the sinks at a point intermediate the ends of the body of liquid medium, and maintaining unidirectional movement of the materials being separated and the liquid medium substantially throughout their respective travels, removing middlings at the surface between the points of sinks discharge and the point of floats discharge and discharging the current of liquid medium at different points along the shallower portion of the liquid medium to control the velocity and inclination of the flow components of the liquid medium.

8. The process according to claim 7 wherein the liquid medium is composed of a suspension of finely ground solids in water which is caused to flow longitudinally in a stream of gradually diminishing cross section and depth with increasing velocity so that the flow converges towards the surface of the stream with resulting directional components which counteract settlement of the suspension solids.

9. Apparatus for separating solid granular materials in a liquid medium of density intermediate those of the solids being separated, consisting in a tank adapted to contain a body of the liquid medium, a shallow end and a deep end in said tank and a uniformly inclined floor extending between said ends, said floor being of concave section across its width, a rubber and canvas conveyor belt adapted to traverse said floor whereby said belt is flexed to the shape of said floor, said belt extending beneath substantially the whole separating zone and being adapted to receive the settling sinks and rise out of the liquid medium with sufficiently gradual inclination to enable said belt to transport said sinks by frictional contact with said carrying surface out of the liquid medium, means for feeding the liquid medium into the deeper end of the tank above said belt to move the medium in the same direction as the conveyor belt, said carrying surface serving to constrain the liquid medium to move over and along the said surface, means extending across the width of the tank for removing liquid medium and the floats from the surface of the liquid medium intermediate the ends of the tank, at a distance from the fed end sufficient to ensure the separation of the sinks from the floats, and means for removing middlings at a point between the floats discharge and the sinks discharge.

FRANK FROST RIDLEY.

REFERENCES CITED

The following references are of record in the file of this patent:

UNITED STATES PATENTS

| Number | Name | Date |
|---|---|---|
| 459,636 | Lanaux | Sept. 15, 1891 |
| 515,542 | Webb | Feb. 27, 1894 |
| 945,692 | Campbell | Jan. 4, 1910 |
| 1,091,534 | Reynold | Mar. 31, 1914 |
| 1,286,554 | Dekker | Dec. 3, 1918 |
| 2,035,118 | Falkener | Mar. 24, 1936 |
| 2,113,609 | Wuensch | Apr. 12, 1938 |
| 2,138,825 | Allen | Dec. 6, 1938 |
| 2,150,917 | Foulke et al. | Mar. 21, 1939 |
| 2,178,456 | Pool | Oct. 31, 1939 |
| 2,209,618 | Vogel | July 30, 1940 |
| 2,271,417 | Dull | Jan. 27, 1942 |
| 2,319,457 | Hirst | May 18, 1943 |
| 2,347,264 | Holt | Apr. 25, 1944 |
| 2,365,734 | Tromp | Dec. 26, 1944 |